Figures 3, 4:
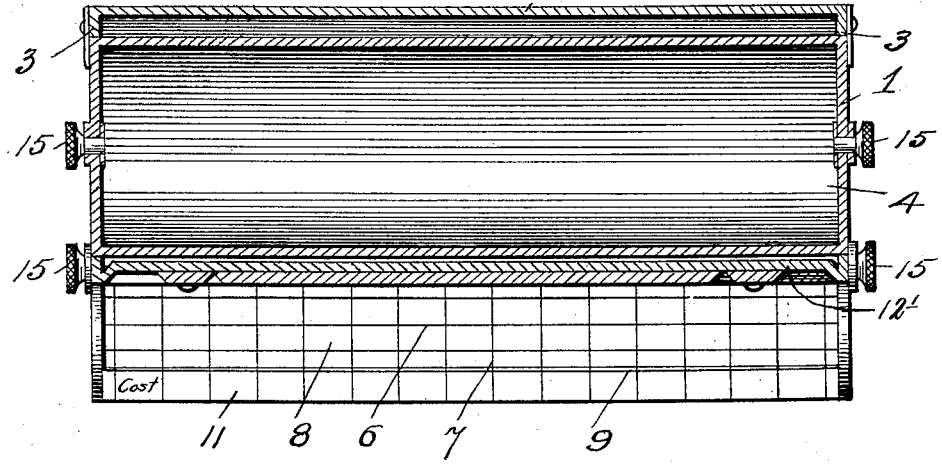

M. W. MIRACLE.
AUTOMATIC COMPUTING DEVICE.
APPLICATION FILED MAY 9, 1911.
1,033,439.
Patented July 23, 1912.
3 SHEETS—SHEET 1.
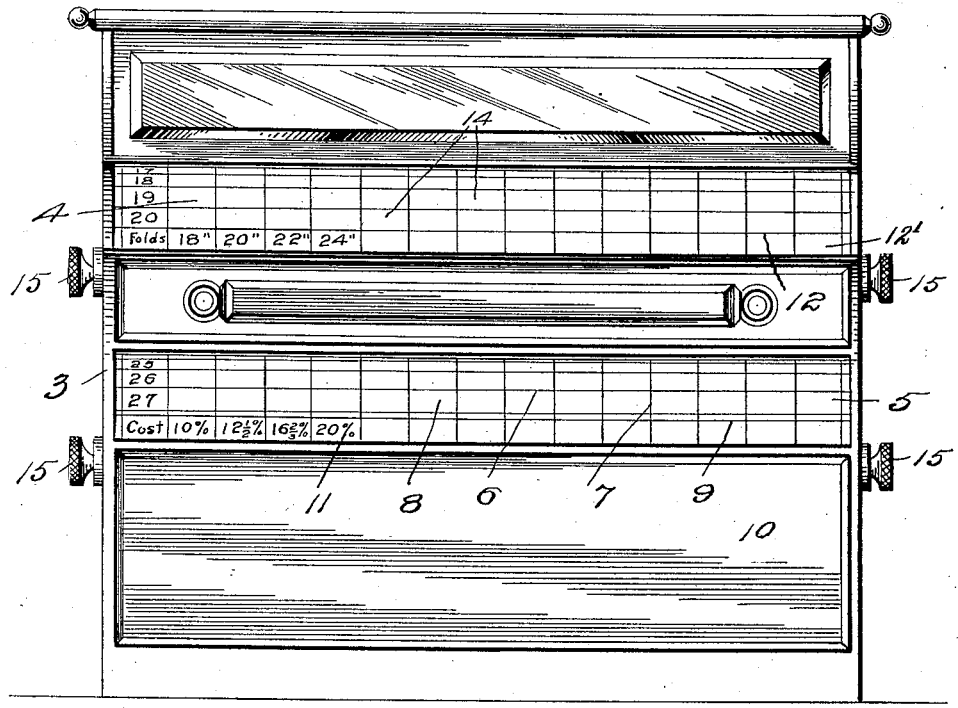
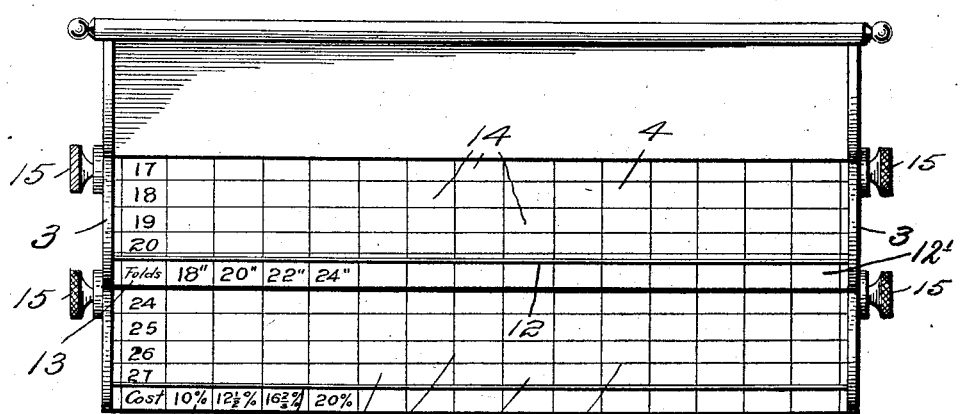

M. W. MIRACLE.
AUTOMATIC COMPUTING DEVICE.
APPLICATION FILED MAY 9, 1911.
1,033,439.
Patented July 23, 1912.
3 SHEETS—SHEET 2.
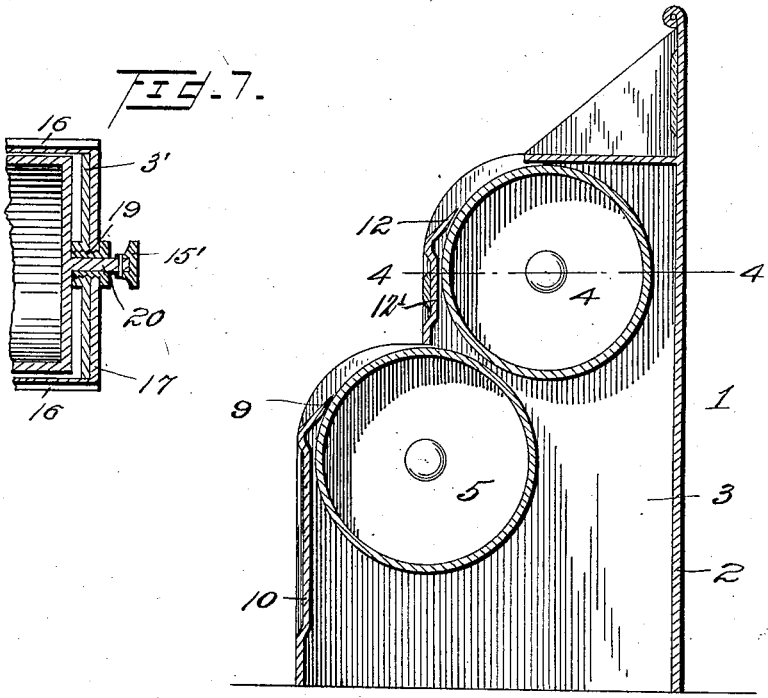
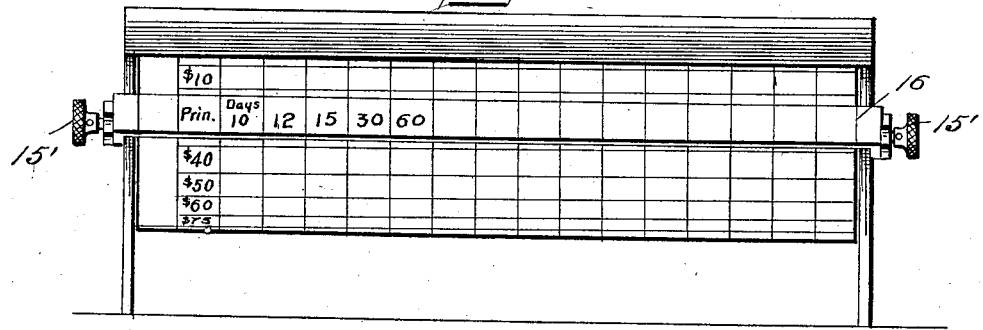
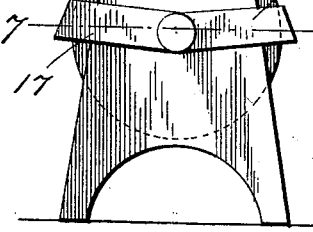
WITNESSES
INVENTOR
Meredith W. Miracle
By John P. Duffie
His Attorney

M. W. MIRACLE.
AUTOMATIC COMPUTING DEVICE.
APPLICATION FILED MAY 9, 1911.

1,033,439.

Patented July 23, 1912.

3 SHEETS—SHEET 3.

| 4 | | | | | | | | 26 | | | | | |
|---|---|---|---|---|---|---|---|---|---|---|---|---|---|
| 5 | 5½ | 5⅝ | 5⁵⁄₁₆ | 6 | 6¼ | 6⅔ | 7½ | 27 | | | | | |
| 6 | | | | | | | | 28 | | | | | |
| 7 | | | | | | | | 29 | | | | | |
| 8 | | | | | | | | 30 | | | | | |
| 9 | | | | | | | | 31 | | | | | |
| 10 | | | | | | | | 32 | | | | | |
| 11 | | | | | | | | 33 | | | | | |
| 12 | | | | | | | | 34 | | | | | |
| 13 | | | | | | | | 35 | | | | | |
| 14 | | | | | | | | 36 | | | | | |
| 15 | | | | | | | | 37 | | | | | |
| 16 | | | | | | | | 38 | | | | | |
| 17 | | | | | | | | 39 | | | | | |
| 18 | | | | | | | | 40 | | | | | |
| 19 | | | | | | | | 41 | | | | | |
| 20 | | | | | | | | 42 | | | | | |
| 21 | | | | | | | | 43 | | | | | |
| 22 | | | | | | | | 44 | | | | | |
| 23 | | | | | | | | 45 | | | | | |
| 24 | | | | | | | | 46 | | | | | |
| 25 | | | | | | | | 47 | | | | | |

WITNESSES
E. C. Duffy
H. G. Hot

INVENTOR
Meredith W. Miracle
By John P. Duff
His Attorney

COLUMBIA PLANOGRAPH CO., WASHINGTON, D. C.

UNITED STATES PATENT OFFICE.

MEREDITH W. MIRACLE, OF DALLAS, TEXAS.

AUTOMATIC COMPUTING DEVICE.

1,033,439.  Specification of Letters Patent.  Patented July 23, 1912.

Application filed May 9, 1911. Serial No. 625,954.

*To all whom it may concern:*

Be it known that I, MEREDITH W. MIRACLE, a citizen of the United States, residing at Dallas, in the county of Dallas and State of Texas, have invented certain new and useful Improvements in Automatic Computing Devices, of which the following is a specification.

My invention relates to automatic computing devices and has for its object to provide a device of this kind which may be used to facilitate the pricing of merchandise for the retail trade and eliminate the possibility of error or which may be used for marking up of discounting bills of invoice in any mercantile line.

A further object is to provide a device designed to be used in taking inventory in dry goods stores, especially in measuring remnant pieces of cloth.

With the foregoing and other objects in view, the invention consists in the novel features of construction, combination and arrangement of parts illustrated in the drawings and more particularly pointed out in the appended claims.

In the accompanying drawings:—Figure 1 is a front elevation of a computing device embodying my improvements as arranged for marking goods for the retail trade and for taking inventory of the stock. Fig. 2 is a top plan view of Fig. 1. Fig. 3 is a vertically transverse sectional view of Fig. 1. Fig. 4 is a horizontal section taken on line 4—4 of Fig. 3. Fig. 5 is a side elevation of the device with but one cylinder used, the device being arranged for computing interest. Fig. 6 is an end view of Fig. 7. Fig. 7 is a fragmentary sectional view showing more particularly how the computing cylinder is mounted in place and Fig. 8 is a diagrammatic view of the chart as arranged for computing the sales price from the cost.

Referring to the drawings for a more particular description of the invention the device comprises the supporting frame 1 consisting of the back wall 2, the side walls 3 and the computing cylinders 4 and 5 arranged one above the other with one cylinder disposed in a plane somewhat in advance of the other cylinder.

As shown in the drawings the lower cylinder 5 is arranged for computing the price to be asked from the cost of the article. In accomplishing this the cylinder is marked off by the horizontal and circular lines 6 and 7 to form the rectangular columns 8. In the column in the left hand end of the cylinder 5 is placed a row of numbers running in consecutive order as shown, and the upper end as 9, of the front wall 10 is bent inwardly, as shown, and is marked off into spaces 11 which register with the columns 8 of the cylinder. In the space of the pointer or index directly opposite the column of figures representing the cost is written the word "Cost", while in the remaining spaces are placed 10%, 12%, 16⅔%, 20%, etc.

In marking a piece of goods for the retail trade assuming that the cost is 25 cts., and that the merchant desires to make a profit of 20% on the sale, the cylinder is rotated until the number "25" registers with the word cost on the index, when by referring to the column in register with the 20% space, the price to be asked will be readily determined, which in the present instance would be 30 cts. The upper cylinder 4 and the upper index 12 have been arranged for taking invoices of dry goods and especially remnants. It has been determined that by counting the folds in a piece of cloth and obtaining the width in inches, the number of yards can be automatically computed. In accomplishing this, the word folds is written in the space 13 at the extreme left hand end of the index 12 and the remaining spaces have been printed therein, 18″, 20″, etc. The index 12 is formed by bending the upper edge of the cross piece 12′ inwardly over the top cylinder 4. The cylinder 4 is marked off to provide the circular columns 14, and in the column at the extreme left of the cylinder is placed a series of numerals indicating the number of folds.

To determine the number of yards in a piece of goods, if it is found that it contains 20 folds and that the folds are 18″ wide by means of my device, it will be readily determined that the piece of cloth contains 10 yards.

In the modification illustrated in Figs. 4, 5 and 6, the device is arranged for computing interest or for discounting bills of invoice.

Fig. 8 is a diagrammatic view of a complete chart for figuring the selling price from the cost, and has been shown to more clearly illustrate the idea.

In the construction shown in Figs. 1, 2 and 3, the ends of the cylinders are provided with thumb nuts 15 for rotating the cylinder.

In the modification illustrated in Figs. 5, 6 and 7, the ends of the bars 16 which form the index are connected by the cross pieces 17 through which and the end pieces 3' of the frame, screw the bushings 19 which act as bearings for the stub shafts 20 projecting from opposite end walls of the cylinder. The ends of the shafts 20 are provided with thumb nuts 15'.

From the foregoing description taken in connection with the drawings it is thought that the construction and advantages of this invention will be readily understood without requiring a more extended explanation.

Having described my invention what I claim as new and desire to secure by Letters Patent, is:—

A computing device of the class described for automatically computing sales price from cost or taking stock, comprising an upright supporting frame consisting of a back wall and end walls provided with openings, a pair of vertically spaced cylinders extending the full length of the supporting frame, one in advance of the other, with their ends fitting in the openings in the end walls and lying flush with the outer faces thereof, a front wall extending from the bottom of the frame to a point opposite the bottom cylinder with its upper edge bent inwardly toward the latter and marked off into spaces provided with indicating matter to form an index, a cross piece extending between the end walls of the supporting frame in front of the top cylinder and a second index formed by bending the upper edge of the cross piece inwardly toward the top cylinder.

In testimony whereof I affix my signature in presence of two witnesses.

MEREDITH W. MIRACLE.

Witnesses:
L. T. GLOVER,
O. F. SMITH.

---

Copies of this patent may be obtained for five cents each, by addressing the "Commissioner of Patents, Washington, D. C."